March 14, 1950 W. S. TANDLER ET AL 2,500,437
DISPENSER
Filed Jan. 10, 1945 7 Sheets-Sheet 1

INVENTOR.
WILLIAM S. TANDLER
DAVID S. WALKER
BY FERDINAND A. DE WEISS

ATT'Y

March 14, 1950  W. S. TANDLER ET AL  2,500,437
DISPENSER

Filed Jan. 10, 1945  7 Sheets-Sheet 2

INVENTOR.
WILLIAM S. TANDLER
DAVID S. WALKER
BY FERDINAND A. DE WEISS

ATT'Y

March 14, 1950 W. S. TANDLER ET AL 2,500,437
DISPENSER

Filed Jan. 10, 1945 7 Sheets-Sheet 4

INVENTOR.
WILLIAM S. TANDLER
DAVID S. WALKER
FERDINAND A. DE WEISS
BY

ATT'Y

March 14, 1950  W. S. TANDLER ET AL  2,500,437
DISPENSER
Filed Jan. 10, 1945  7 Sheets-Sheet 5

INVENTOR.
WILLIAM S. TANDLER
DAVID S. WALKER
BY FERDINAND A. DE WEISS

ATT'Y

March 14, 1950     W. S. TANDLER ET AL     2,500,437
DISPENSER Filed Jan. 10, 1945                            7 Sheets-Sheet 6

Fig. 7

INVENTOR.
WILLIAM S. TANDLER
DAVID S. WALKER
BY FERDINAND A. DE WEISS

ATT'Y

Fig. 8

Patented Mar. 14, 1950

2,500,437

UNITED STATES PATENT OFFICE 2,500,437

DISPENSER

William S. Tandler, David S. Walker, and Ferdinand A. de Weiss, New York, N. Y., assignors, by mesne assignments, to Vendomatic Machine Corporation, New York, N. Y., a corporation of Delaware Application January 10, 1945, Serial No. 572,220

19 Claims. (Cl. 312—63)

The invention relates to a device for dispensing individual articles of merchandise, for instance merchandise packages, and it relates more particularly to devices which will automatically control the delivery of different items of merchandise from a container.

Known devices of this type are operated on the principle of gravity feed; the articles or packages to be delivered are vertically stacked one upon another; as delivery is required a barrier is removed from the path of the lowest package in the vertical column allowing for its delivery as a result of the combined weight of all packages above it.

These merchandise dispensing devices do not work satisfactorily for the reason that their application is limited to the handling of articles and packages which are not affected by large pressure; furthermore, the capacity of this type of device is limited to a comparatively small number of varieties of merchandise, since each vertical column must, of necessity, carry the same item. If it is required to dispense a large number of different items, the great horizontal distance required would make the device prohibitively large.

It is the object of the invention to render the delivery of individual articles of merchandise and particularly of merchandise packages independent of their weight as a delivery promoting agent.

It is another object of the invention to control the operation of the dispenser by the positive action of a delivery or discharge mechanism.

It is also an object of the invention to allow for the storage in a dispenser of a much greater variety of merchandise items than has been hitherto possible.

It is a further object of the invention to make provisions for the simultaneous delivery of a number of different items.

It is also an object of the invention to provide simple, effective means for an unobstructed continuous operation of the dispenser.

It is a further object of the invention to render this operation substantially automatic.

It has been found that these and other objects which will become apparent as this specification proceeds, can be satisfactorily accomplished by the provision in the dispenser housing of a series of trays arranged in horizontal rows and vertical banks in each of which trays a plurality of the items of merchandise, for instance, merchandise packages are successively alined, provisions being made that such tray may accommodate a different variety of merchandise.

Associated with each tray is a pusher mechanism adapted to advance the packages alined before it. This pusher mechanism is securely fastened to a flexible element, such as a cable, which pulls the pusher toward the front portion of the tray, whereby the front package is caused to fall from the tray into a delivery passage. The pulling force applied to the cable is preferably the result of the closing of an electrical circuit by means of a selective push button switch. A number of push buttons equal to the number of trays is provided so that any one of the many different items of packaged merchandise may be selected for delivery.

The invention will now be described in detail with reference to the annexed drawings illustrating a preferred embodiment thereof.

The dispenser housing is denominated in the drawing by A; a number of flat trays or platforms I is mounted in this housing.

Figure 2:
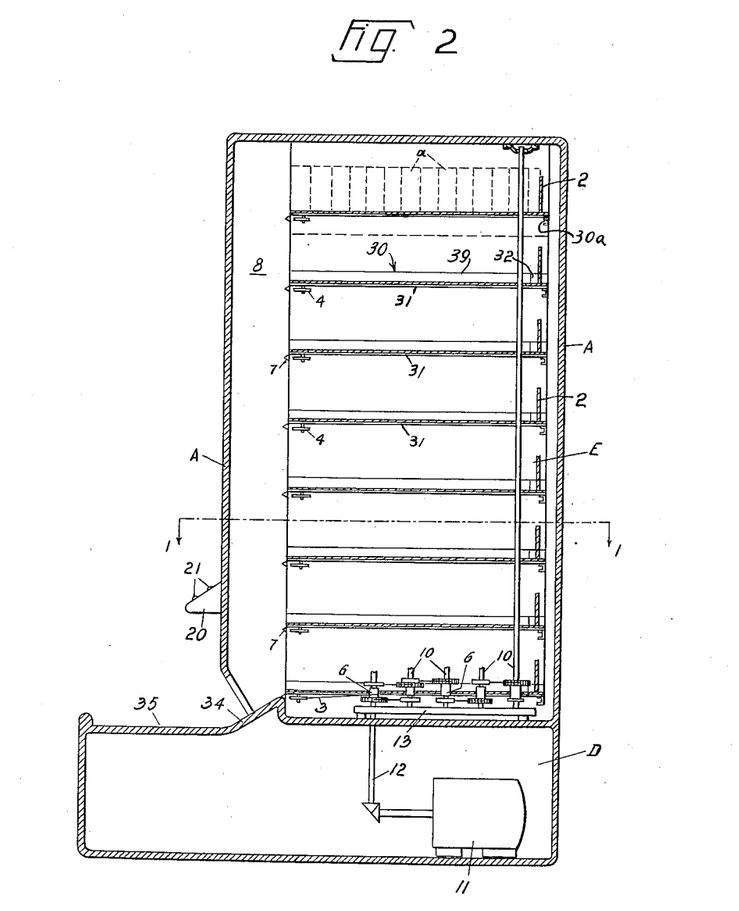
Fig. 2 is a schematic vertical sectional elevation on line 2—2 of Fig. 1.

In the embodiment of the invention shown in the drawing eighty trays I are provided next to each other in eight horizontal rows and superposed in ten vertical banks; packages a are alined on these trays in direct succession, as indicated in Fig. 2.

Figure 4:
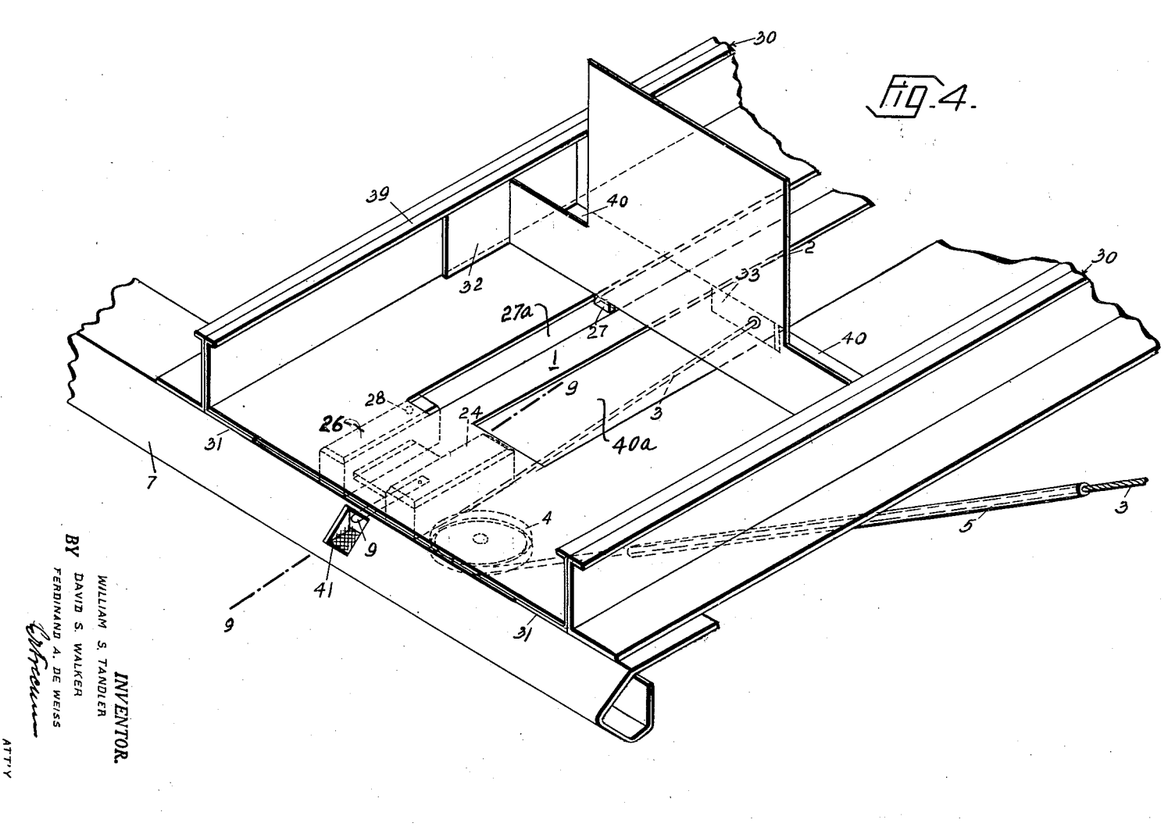
Fig. 4 is a perspective top view of one delivery tray showing in detail the package pusher mechanism, the mechanism for the automatic interruption of its advance movement and the means for preventing further package delivery after the last package has been delivered from the tray.

The platforms or trays I are supported on the lower broad flanges 31 of parallel double-T-beams 30, Fig. 4, which are supported at their rear ends on channels 30a fixed to the back of the housing A; these beams and the platforms carried thereon extend substantially through the entire width of the dispenser. A pusher plate 2 is slidably supported on each platform I and guided during its movement over the platform by end bends 32, Fig. 4, which are situated between the upper smaller flanges 39 of T-beams 30 and platform I.

Each pusher 2 is provided with a bottom flange 40 projecting rearwardly from the same and connected to the rear portions of end bends 32; this flange serves as a guide during the displacement of the pusher on the tray I; a lip 33 is attached to this flange 40 projecting downwardly through the tray; a slot 40a is provided in the latter to permit the displacement of the lip with the pusher; the displacement is effected by a rope 3 fastened to the lip 33; the rope runs over a pulley 4 and is connected with means to advance the pusher; these means are described in a later part of this specification; thin tubes 5 are provided at the underside of the tray structure for the guidance of ropes 3.

If a pull is exerted by ropes 3 on the pushers 2, the latter will advance on the trays towards their front edges and, therefore, push the packages which are alined on the trays in front of the pusher to delivery passage 8.

A discharge lip 7 is fastened to the front edge of the trays. The packages slide over this lip into discharge passage 8; they fall onto an inclined delivery chute 34 and finally arrive on platform 35 from where they may be picked up by the purchasers.

A device for stopping the advance of the pushers consisting of a normally closed switch 24 is fastened on the underside of the forward end of each tray I; the switch is in a customary manner provided with a contact tongue 9 projecting into a recess 41 of lip 7. A package pushed from the platform strikes against resilient tongue 9 and actuates the switch which will stop further advance of the pusher 2 in a manner which will be described in detail in a later part of this specification; after the package has been discharged from the tray, the tongue is returned in its former position and the switch is closed.

A free center space C is provided within the dispenser housing A between the left and the right tray group, each consisting of forty trays. This space extends vertically through substantially the whole height of the tray accommodating chamber E; underneath this tray accommodating chamber is a second chamber D provided for a purpose which will be explained later.

Means for the advance of the pushers 2 by cable 3 are situated in center space C.

Figure 5:
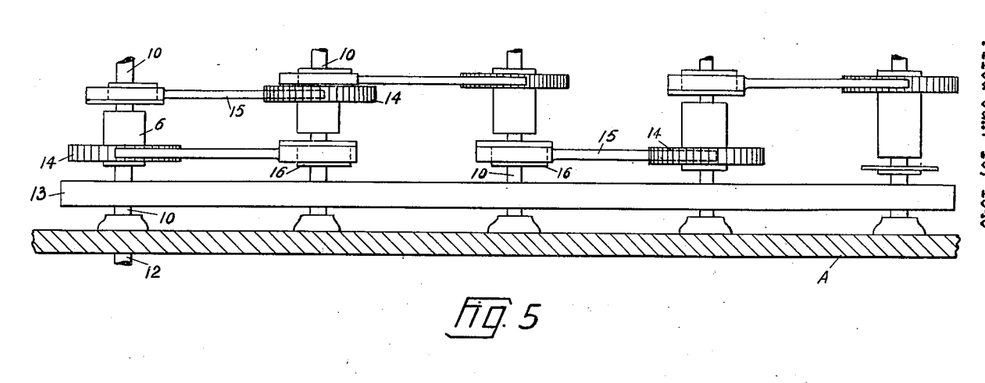
Figure 5 is an enlarged vertical sectional view of the means for effecting displacement of the package pushers mounted on a group of five trays arranged in a horizontal row, these packages being shown on a reduced scale in Fig. 2.
Figure 6:
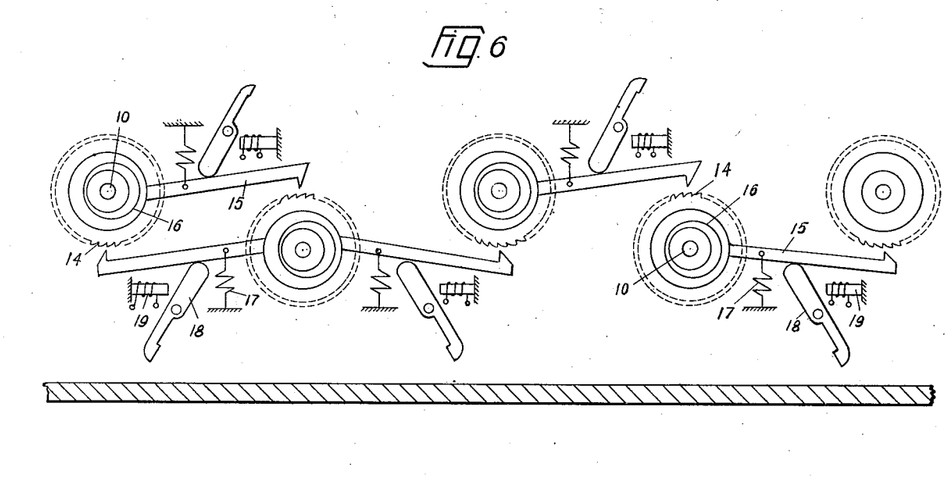
Fig. 6 is a top view of the means shown in Fig. 5.

These means which are in detail shown in Figs. 5 and 6 consist in the present embodiment of the invention of ten vertical shafts 10 coordinated to the ten trays of each horizontal row; five shafts are located adjacent to the left tray group and five adjacent to the right tray group; the shafts are carried in bearings which are located in chamber 13 and in the top portion of the tray acommodating chamber E.

A driving motor 11 is situated in chamber D. The rotation of this motor is transmitted by shaft 12 to transmission gears of customary construction located in a gear chamber 13 supported on the bottom wall of chamber E, the gears being not shown to prevent overcrowding of the drawings; the shafts 10 passing through gear chamber 13 are driven by these gears.

A sleeve 6 is located freely movable on each shaft 10; therefore, the rotation of the shafts as such will have no effect on sleeves 6. A ratchet wheel 14 is mounted on each sleeve 6 and an eccentric 16 is carried by each shaft 10; pawls 15 are rotatably carried by the eccentrics for instance by a ring fastened to the end thereof and loosely engaging the eccentric and so arranged that during the reciprocative movement imparted to them by the eccentrics the pawls may be brought in operative connection with ratchet wheels 14 by springs 17.

The rotation of the eccentrics 16 imparts, as previously stated, a reciprocating motion to their respective pawls 15 which when the pawls are in contact with their associated ratchet wheels 14 will cause an intermittent rotation of sleeves 6.

Figure 3:
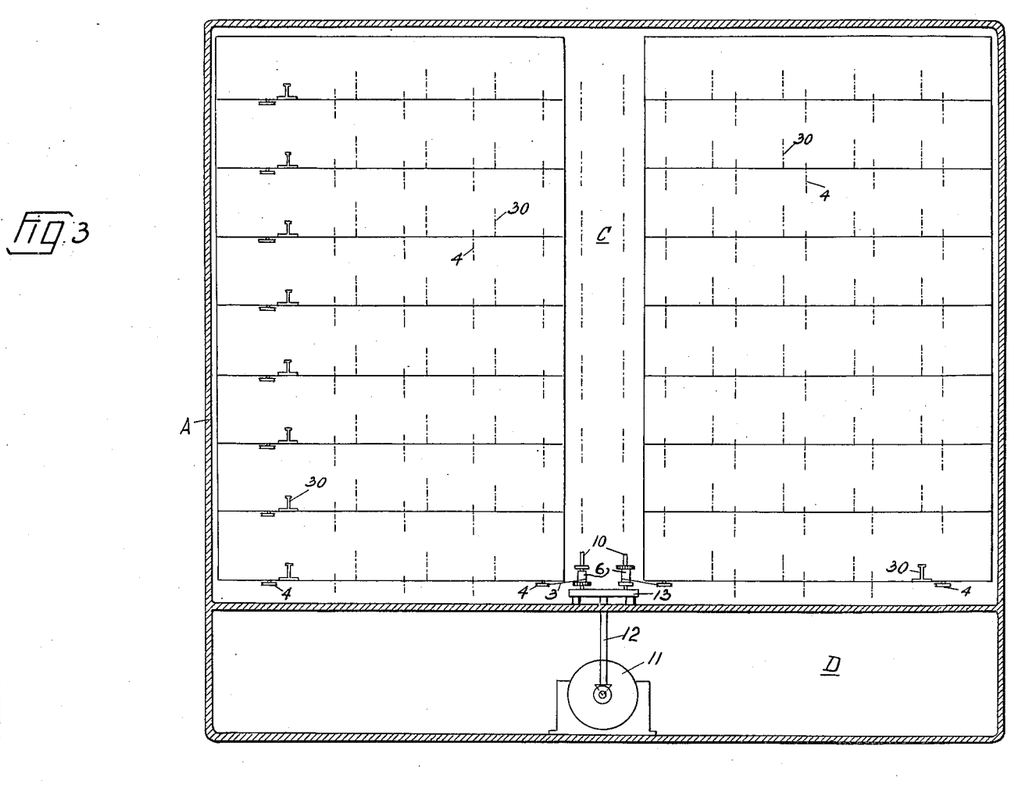
Fig. 3 is a schematic vertical sectional elevation on line 3—3 of Fig. 1.

The sleeves 6 are connected with the cables 3, as shown in Figure 3. Due to the rotation of sleeves 6 the cables 3 will be wound onto the same whereby a pulling action is exerted on the cables 3, causing an advance of the pushers 2 and therewith of the packages alined in front of the pushers on trays I. The pawls 15 normally do not coact with the ratchet wheels 14; therefore, the reciprocative movement of the pawls 15 will normally not result in an advance of pushers 2. Cooperation between pawls 15 and ratchet wheels 14 is, however, effected by levers 18 forming the armature of solenoids 19. The disconnection of pawls 15 from the ratchet wheels 14 is assured by springs 17, Fig. 6.

Figure 1:
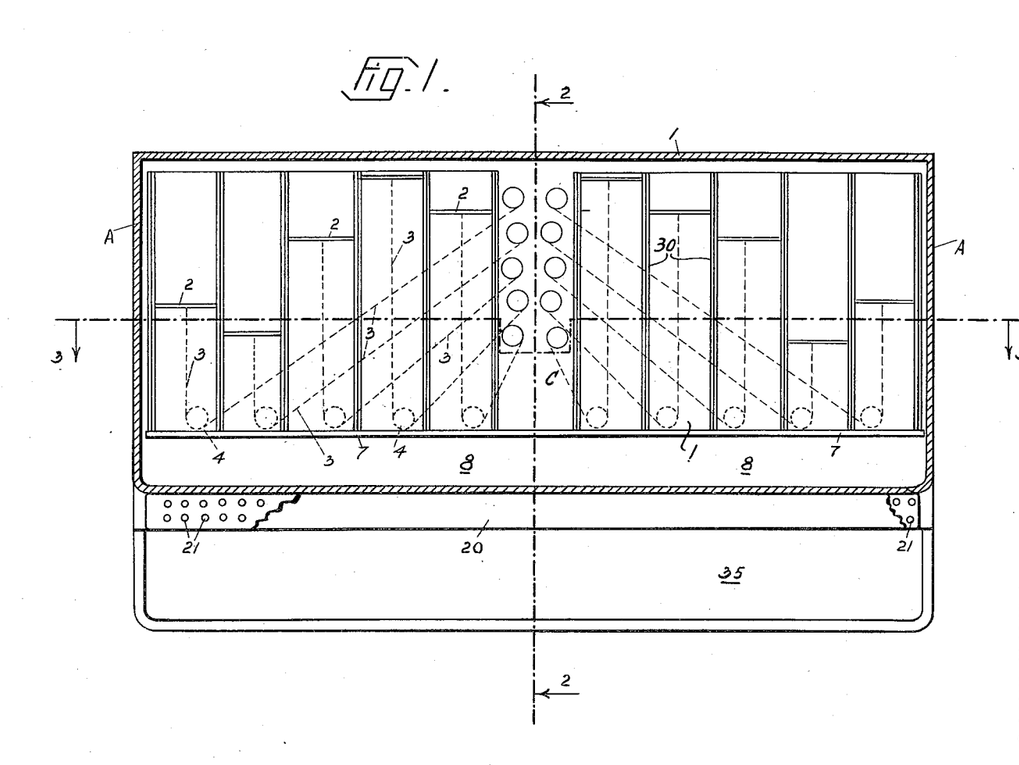
Fig. 1 is a schematic horizontal sectional elevation of the dispenser on line 1—1 of Fig. 2, the advance of the package pusher being indicated to different delivery positions.

Push buttons 21 located on the ledge 20, Figures 1 and 2, are correlated with each tray. Thus when an electric circuit is closed by pressing down a push button and current is caused to flow through the coils of a solenoid 19, one arm of a rotatable two-arm lever 18 is attracted toward the core of the solenoid 19, Figure 6, thereby forcing the associated pawl 15 to engage the ratchet wheel 14.

The current necessary for the energization of the solenoid 19 is, as mentioned above, caused to flow by actuation of a push button which completes an electric circuit described in detail in a later part of this specification. The pawls 15 will remain in engagement with the ratchet wheels 14 and continue to cause their rotation until the circuit flow through solenoids 19 is interrupted. This is accomplished by the discharged package which actuates switch 24, Fig. 4, by striking against resilient tongue 9.

Upon interruption of the current by the advancing package, solenoid 19 is deenergized and restoring spring 17 draws the pawl 15 away from the ratchet wheel 14, thus ending the rotary motion imparted to the sleeve 6; further advance of the pusher 2 and the packages is thus interrupted.

Figure 8:
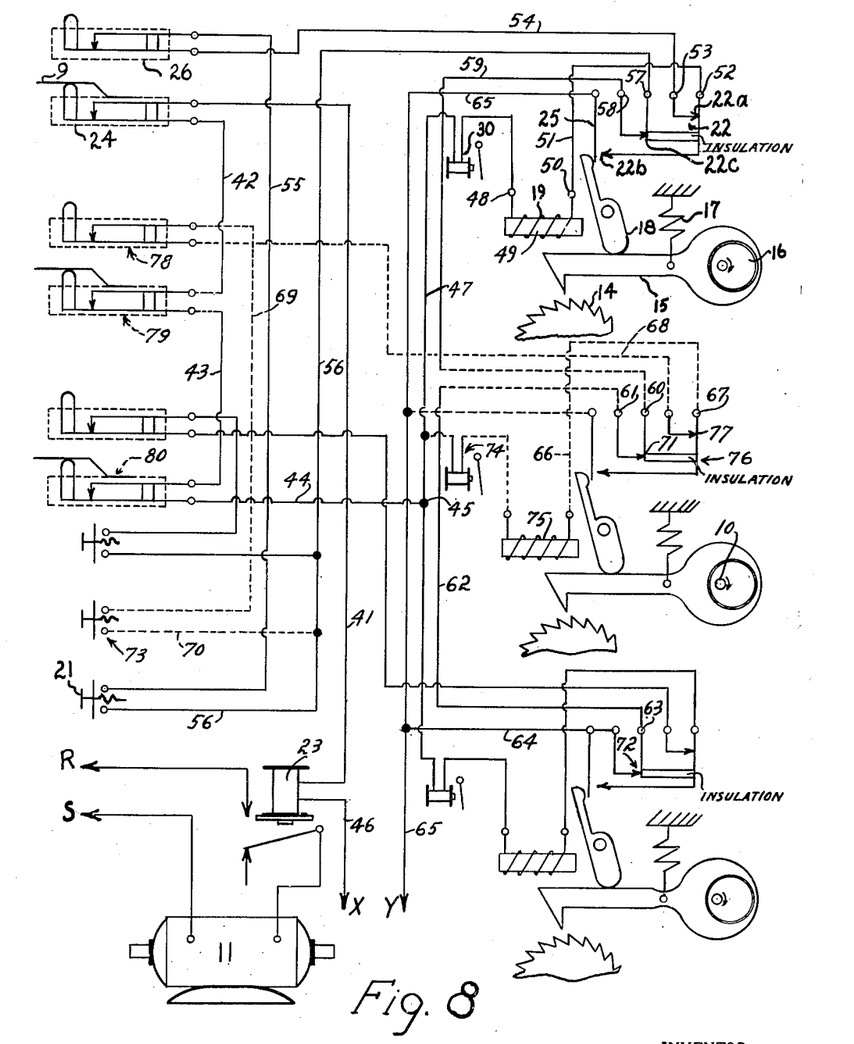
Fig. 8 shows the complete circuit diagram of the electrical control system in one vertical bank.
Figure 9:
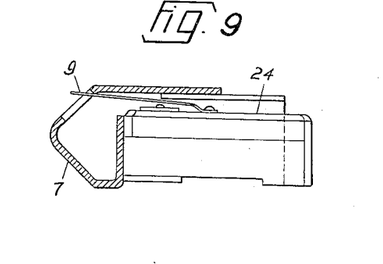
Fig. 9 is a vertical sectional elevation on an enlarged scale on line 9—9 of Fig. 4 of a switch for interrupting the advance of the package pusher.

From the above it is apparent that the drive motor 11 and shafts 10 driven therefrom may be in continuous operation without in any way affecting the operation of the described mechanism since a pulling force is applied to pushers 2 through cables 3 by means of rotating sleeves 6 only when the pawls 15 cooperate with ratchet wheels 14 as a result of the energization of solenoids 19 and the resulting action of levers 18. The energization of solenoids 19, Fig. 8, is achieved through the flow of current from power supply X, through wire 46 to motor starting relay coil 23, then along wire 41 to and through normally closed switches 24, 79, 80 connected in series by means of wires 42 and 43. The flow of current continues along wire 44 to contact point 45, thence along wire 47 through magnetic counter 30 to terminal 48 of solenoid 19, through the solenoid winding 49 to terminal 50 of the solenoid. From terminal point 50 the current travels along wire 51 to terminal 52 of switch 22 from which point it travels to contact 22a and to terminal 53 from which point the current passes along wire 54 to limit switch 26. From switch 26 the current flows along wire 55 to push button 21, which, when closed, permits the current to flow along wire 56 to terminal 57. The current then passes through switch contact 22C to terminal 58 from which it flows along wire 59 to terminal 60 of switch 76 through switch contact 71 to terminal 61 along wire 62 to terminal point 63. The current then passes through switch contact 72 along wire 64 through wire 65 to power supply lead Y completing the circuit.

It is also apparent from the above that the device may contain any number of trays 1 and pushers 2 together with the associated driving mechanism, each operating independently of the other and the action of each being controllable by means of a push button through an electrical circuit.

Figure 7:
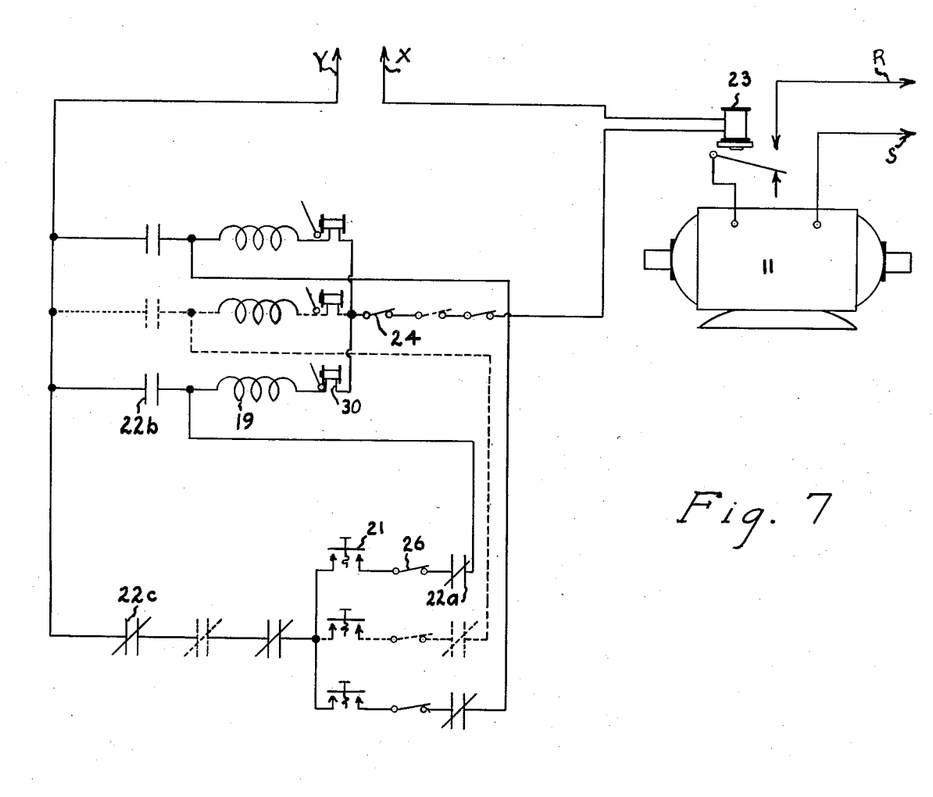
Fig. 7 shows a schematic wiring diagram of the electrical system for controlling the selection and delivery of the packages and the recording of the delivery.

Referring now to Figs. 7 and 8 a schematic wiring diagram of the electrical control system and a complete circuit diagram of the electrical system is shown therein for the control of the storage and delivery trays 1 in any one vertical bank. Each additional vertical bank of trays would be provided with the same controlling circuit.

The circuit is shown in its deenergized condition, control elements for three separate delivery trays 1 being indicated; however, any number of control elements and any number of delivery trays may be added by connecting them into the circuit as indicated by the dotted line elements.

The operation of the dispenser is as follows:

It is assumed that the delivery of a package from a specific tray is required. Control board 20 located on the front face of the dispenser carries, as previously mentioned, a number of push buttons 21, equal to the number of trays 1 and each button is labeled to indicate the tray which it controls.

If delivery is required from a particular tray, the coordinated push button is depressed energizing associated solenoid coil 19 through normally closed contact 22c, 22a of a customary make before break switch 22 composed of contacts 22a, 22b, 22c and normally closed stop switch 24.

As the one arm of double arm lever 18 is attracted by the energized solenoid 19 thus moving pawl 15 into position to cause the rotation of ratchet wheel 14, the other arm acts upon arm 25, Fig. 8, of a customary make before break switch, causing the closing of contacts 22b and opening of contacts 22c and 22a, thus rendering the push buttons serving the other trays of the same vertical bank not associated with the actuated solenoid, ineffective. The flow of current for energizing the solenoid 19, as a result of the operation of the push button 21, has been described previously. It is apparent that the opening of the contacts 22a and 22c and the closing of the contact 22b eliminates the push button 21 from the circuit. The path of the current flow then is from the power supply line X through the wire 46, the motor starting relay coil 23, the wire 41, the normally closed switch 24, the wire 42, the normally closed switch 79, the wire 43, the normally closed switch 80, the wire 44, the terminal 45, the wire 47, the magnetic counter coil, the coil 19, the wire 51, the terminal 52, the switch contact 22b which is now closed, the blade 25, the wire 65 to the power supply line Y, thus completing the circuit, with the push button 21 now out of the circuit.

For further clarification, the tray controlled by the push button 73 may be considered. The circuit, when the device is in operation because of actuation of the button 21 and the push button 73 is depressed, is as follows:

From the power supply line X through the wire 46, the motor starting relay coil 23, the wire 41, the switches 24, 79 and 80 in series through the wires 42 and 43, then through the wire 44 to the connection point 45, the wire 47, the magnetic counter coil 74, the coil 75, the wire 66, the terminal point 67 of the switch 76, through the contact 77, wire 68, the switch 78, the wire 69, the push button 73 now closed, the wire 70, the wire 56 to the terminal point 57. Inasmuch as the contact 22c is open as the result of the actuation of the arm 18 because of the previous operation of the switch 21, the circuit through all of the push buttons is open, and consequently actuation of the button 73 is ineffective to energize the corresponding solenoid 75.

There is no electrical connection between the control circuits of separate vertical banks of trays except to the motor starting relay 23.

The above described action prevents the simultaneous operation of more than one tray of the same vertical bank and renders by preventing the simultaneous delivery of two packages from trays in the same vertical bank the jamming of several packages in the delivery passage 8 impossible.

This procedure, however, has no effect upon the operation of the delivery mechanism in the other vertical banks, so that the simultaneous delivery of many packages is possible provided they are not stored in the same vertical bank.

The closing of contacts 22b keeps the solenoids 19 energized even though the push buttons 21 should not be in the depressed position. The push buttons 21 may be, therefore, of the momentary contact type and contact 22b will serve to maintain energization of the solenoid until the delivery of the package has been accomplished.

As a package falls from its tray into delivery passage 8, it strikes the actuator lip 9 of stop switch 24 interrupting the current circuit. The opening of switch 24, which deenergizes solenoid 19, enables the restoring spring 17 to interrupt the cooperation between pawl 15 and ratchet wheel 14, thus stopping the rotation of sleeve 6 and consequently that of pusher 2.

In this manner, further delivery of the packages is interrupted as soon as a package is discharged from its storage tray.

The action of the spring 17 in moving the pawl 15 away from the ratchet 14, moves the lever 18 away from the solenoid 19 and also releases the arm 25 of the switch 22, Figure 8, restoring the contacts 22a, 22b and 22c to their initial positions. The contact 22b is arranged to displace the contacts 22a and 22c as the contact 22b is displaced to the right or left. Therefore, the contacts 22a and 22c are closed when the contact 22b is open, and when the contact 22b is closed, the contacts 22a and 22c are open.

It was indicated in an earlier part of this specification that the opening of contacts 22c prevents the operation of a second delivery tray in the same vertical bank while one tray is operating; if, however, the push button 2 should unintentionally remain depressed, this safeguard would be inoperative. If, for instance, a push button 21, the actuation of which causes delivery from one tray, remains depressed for some reason or other, the energization of coil 19 will result in the closing of contacts 22b through the action of lever 18. If now a second push button in another vertical bank is depressed, calling for delivery from a second tray, a circuit would be completed through 22b, now closed, and on to the energization of coil 19, thus initiating operation of the second tray. However, the provision of switch 22, which causes operation of lever 18 as a result of energization of solenoid 19, prevents the completion of the circuit in this direction, thus effectively rendering all push buttons in the same vertical bank inoperative while the delivery mechanism of one of the circuits is in operation.

Another safeguarding element is represented by a device preventing operation of the advance and delivery mechanism of any tray after the last package stored thereon has been delivered. This is accomplished by means of limit switch 26, Fig. 4, which is normally closed permitting passage of current each time a push button is depressed. However, as the last package on the tray is delivered and the pusher 2 has terminated its travel, projection 27 traveling along the slot 21a of tray 1 fastened to the bottom of the pusher contacts actuating button 28 of switch 26 mounted on the underside of the tray 1, thus opening the same and preventing any further operation of the tray in question. Projection 27 will remain in contact with actuator button 28 until pusher plate 2 is manually replaced in its initial position, thus preventing operation until the tray is reloaded.

In order to indicate the number of packages delivered from each tray a magnetic counter of a customary type may be provided at a suitable place at the front face of the dispenser, for instance on ledge 20; a coil 30 is provided, see Fig. 8, for the actuation of the counter which coil is connected in series with the energizing coil of the solenoids 19. Thus, each time the solenoid is energized resulting in the operation of the described delivery mechanism, the coil 30 is energized causing a counter to be actuated, whereby each delivered package is registered.

Although the present system has been described for one vertical bank of trays, it may equally well be used in apparatus having any number of vertical banks without change in the operating mechanisms or the electrical control circuit.

As many changes could be made in the above construction and many apparently widely different embodiments of this invention could be made without departing from the scope thereof, it is intended that all matter contained in the above description or shown in the accompanying drawings shall be interpreted as illustrative and without limitation of the invention.

We claim:

1. A dispenser for individual articles of merchandise and particularly for merchandise packages comprising in a housing a plurality of alined package supporting trays in said housing located in adjacent relation in horizontal rows and in spaced spuperposed relation in vertical banks, a pusher slidably supported on each tray for the discharge of the packages, an electrical circuit and electrical control means therein correlated with each individual tray operative upon closing a selected element in said circuit to advance the selected pusher and the selected package along the selected tray and over the front portion thereof to a place of delivery, said control means each including a circuit closing push button, a solenoid, a rotatable lever forming the solenoid armature, and a rockable and reciprocable hooked element actuated by the rotation of said lever, toothed means actuated by said element to advance the pusher, means actuated by the package passing the front portion of the selected tray to deenergize said solenoid, means to interrupt the cooperation between said lever actuated element and the means to advance the pusher to terminate its advance and to restore the initial position of said lever.

2. A dispenser for individual articles of merchandise and particularly for merchandise packages comprising in a housing a plurality of alined package supporting trays located in adjacent relation in horizontal rows and in spaced superposed relation in vertical banks, an electrical circuit including switches, each correlated with a different tray to advance the packages of a single tray of a vertical bank over the front portion of said tray to a place of delivery upon closing of its correlated switch, means included in said electrical circuit to render switches correlated with the other trays of the same vertical bank ineffective and means actuated by the package passing the front portion of the selected tray to interrupt the advance of the residual packages.

3. A dispenser for individual articles of merchandise and particularly for merchandise packages comprising in a housing a plurality of alined package supporting trays located in adjacent relation in horizontal rows and spaced superposed relation in vertical banks, a pusher slidably supported on each tray for the discharge of the packages, an electrical circuit and electrical control means therein correlated with each individual tray and operative upon closing a selected element in said circuit to advance the selected pusher and the selected package successively on the selected tray and over the front portion thereof to a place of delivery, and means actuated by the package passing the front portion of the selected tray to interrupt the advance movement of the selected pusher, said control means each including in said housing a push button, a solenoid, a rotatable double arm lever forming the solenoid armature, a reciprocable and rotatable hooked element actuated by the rotation of one arm of said lever, toothed means actuated by said element to advance the pusher of the selected tray, means actuated by the rotation of the other arm of said lever to render the push buttons of the other trays of the same vertical bank ineffective and means actuated by the package passing the front portion of the selected tray to interrupt the advance of the residual packages.

4. A dispenser for individual articles of merchandise and particularly for merchandise packages comprising in a housing a plurality of alined package supporting trays located in adjacent relation in horizontal rows and in spaced superposed relation in vertical banks, an electrical circuit and electrically controlled means therein correlated with each tray and operative upon closing a push button in said circuit to advance the selected package successively on the selected tray and over the front portion thereof to a place of delivery, said means each including in said housing a solenoid, a rotatable lever forming the solenoid armature, a plurality of shafts, a sleeve loosely supported and an eccentric rigidly mounted on each shaft, a ratchet wheel fixed on said sleeve, a pawl carried by said eccentric to be reciprocated by rotation of the latter, each pawl being positioned to be moved into cooperation with a ratchet wheel of a second shaft by said rotatable lever and to thereby intermittently rotate said ratchet wheel and said sleeve connected therewith, and means to impart rotation to said shafts.

5. A dispenser for individual articles of merchandise and particularly for merchandise packages comprising in a housing a plurality of alined package supporting trays located in adjacent relation in horizontal rows and in spaced superposed relation in vertical banks, a pusher slidably supported on each tray for the discharge of the packages, an electrical circuit and electrically controlled means therein correlated with each tray and operative upon closing a push button in said circuit to advance said package successively on the selected tray and over the front portions thereof to a place of delivery, said means each including in said housing a solenoid, a rotatable lever forming the solenoid armature, a plurality of shafts, a sleeve loosely supported and an eccentric rigidly mounted on each shaft, a ratchet wheel fixed on said sleeve, a pawl carried by said eccentric to be reciprocated by rotation of the latter, each pawl being positioned to be moved into cooperation with a ratchet wheel of a second shaft by said rotatable lever and to intermittently rotate said ratchet wheel and said sleeve connected therewith, means to impart rotation to said shafts, and means utilizing the rotation of said sleeve to advance the pusher.

6. A dispenser for individual articles of merchandise and particularly for merchandise packages comprising in a housing a plurality of alined packages supporting trays located in adjacent relation in horizontal rows and spaced superposed relation in vertical banks, an electrical circuit and electrically controlled means therein correlated with each tray and operative upon closing a push button in said circuit to advance said package successively on the selected tray and over the front portion thereof to a place of delivery, said means each including in said housing a solenoid, a rotatable lever forming the solenoid armature, a plurality of shafts, a sleeve loosely supported and an eccentric rigidly mounted on each shaft, a ratchet wheel fixed on said sleeve, a pawl carried by said eccentric to be reciprocated by rotation of the latter, each pawl being positioned to be moved into cooperation with a ratchet wheel of a second shaft by said rotatable lever and to intermittently rotate said ratchet wheel and said sleeve connected therewith, means to impart rotation to said shafts, and means actuated by the package passing the front portion of the trays to interrupt further movement of the package advancing means.

7. A dispenser for individual articles of merchandise and particularly for merchandise packages comprising in a housing a plurality of alined package supporting trays located in adjacent relation in horizontal rows and in spaced superposed relation in vertical banks, a pusher slidably supported on each tray for the discharge of the packages, an electrical circuit and electrically controlled means therein correlated with each tray and operative upon closing a push button in said circuit to advance the selected pusher to move said packages successively on the selected tray and over the front portion thereof to a place of delivery, said means each including in said housing a solenoid, a rotatable lever forming the solenoid armature, a plurality of shafts, a sleeve loosely supported and an eccentric rigidly mounted on each shaft, a ratchet wheel fixed on said sleeve, a pawl carried by said eccentric to be reciprocated by rotation of the latter, each pawl being positioned to be moved into cooperation with a ratchet wheel of a second shaft by said rotatable lever and to intermittently rotate said ratchet wheel and said sleeve connected therewith, means to impart rotation to said shafts, means to utilize the rotation of said sleeve to advance the pusher, and means actuated by the package passing the front portion of the selected tray to interrupt further advance movement of the pusher.

8. A dispenser for individual articles of merchandise and particularly for merchandise packages comprising in a housing a plurality of alined package supporting trays located in adjacent relation in horizontal rows and in spaced superposed relation in vertical banks, an electrical circuit and electrically controlled means therein correlated with each tray and operative upon closing a push button in said circuit to advance packages successively on the selected tray and over the front portion thereof to a place of delivery, said means each including in said housing a solenoid, a rotatable lever forming the solenoid armature, a plurality of shafts, a sleeve loosely supported and an eccentric rigidly mounted on each shaft, a ratchet wheel fixed on said sleeve, a pawl carried by said eccentric to be reciprocated by rotation of the latter, each pawl being positioned to be moved into cooperation with a ratchet wheel of a second shaft by said rotatable lever and to intermittently rotate said ratchet wheel and said sleeve connected therewith, means to impart rotation to said shafts, a switch located at the front part of each tray to be opened by the package passing said front portion to interrupt the circuit current and to prevent further advance of the pusher and of the packages.

9. An article dispensing device comprising a substantially horizontal support for a plurality of articles, means movable lengthwise of said support for advancing said articles along said support and discharging them successively at one end thereof, driving means for moving said advancing means, mechanism including a pawl and ratchet, for connecting said driving means to and disconnecting it from said advancing means, manually controllable means for actuating said mechanism to connect said driving means to said advancing means to discharge an article, and means engageable by said discharged article to actuate said mechanism to disconnect said driving means from said advancing means.

10. An article dispensing device comprising a substantially horizontal support for a plurality of articles, means movable lengthwise of said support for advancing said articles simultaneously and discharging them successively at one end of said support, a motor for moving said advancing means, a pawl and ratchet mechanism connecting said motor and said article advancing means, said pawl being movable into and out of driving relation with said ratchet, electrical means energizable to move said pawl into driving relation with said ratchet, means to move said pawl out of driving relation with said ratchet when said electrical means is deenergized, a manually operable switch for energizing said electrical means, and another switch actuated by discharge of an article from said support for deenergizing said electrical means.

11. An article dispensing device comprising a plurality of vertically superimposed substantially horizontal supports for a plurality of articles, a pusher member movable along each support to advance said articles thereon and discharge them successively at one end of each support, a driving means for all of said pusher members, an electrically actuated means corresponding to each pusher member for selectively connecting said driving means to and disconnecting it from its corresponding pusher member, a first switch means corresponding to each pusher member, means electrically connecting said first switch means and said electrically actuated means to connect said driving means to a pusher member upon actuation of its corresponding switch means, and means responsive to actuation of any of said first switch means for rendering ineffective all of the other first switch means, and second switch means adjacent to said one end of each support actuated by discharge of an article therefrom to disconnect said driving means from the pusher member connected thereto.

12. A dispenser for individual articles of merchandise and particularly for merchandise packages comprising a housing, a plurality of horizontal rows of article supporting members, each row including a plurality of said article supporting members disposed substantially horizontally and extending from adjacent to the front to adjacent to the back of said housing, said members being arranged to provide a free center space in said rows, a pusher movable lengthwise of each member to displace the packages lengthwise of said members for discharge and fall by gravity from one end of the corresponding member, an electrical circuit and electrically controlled means therein correlated with each pusher located in said free center space and operative upon closing a push button in the circuit to advance the selected pusher and to thereby advance said packages along said member and over one end thereof to a place of delivery, and means below the level of said packages on said member actuated by the package falling from the member to interrupt said advance movement.

13. A dispenser for individual articles of merchandise and particularly for merchandise packages comprising a housing, a plurality of aligned substantially horizontal package supporting trays located in adjacent relation in horizontal rows and in spaced superposed relation in vertical banks, a pusher slidably supported on each tray for the displacement of the packages horizontally along said trays, an electrical circuit and electrically controlled means therein correlated with each tray operative upon closing a selected element in said circuit to advance a pusher along a selected tray to discharge a package over the front portion thereof to fall to a place of delivery common to all of said trays and a switch located at the front part of and below each tray to be opened by the package falling from said front portion to interrupt the circuit current and to prevent further advance of the pusher and of the package.

14. A dispenser for individual articles of merchandise and particularly for merchandise packages comprising a housing, a plurality of horizontal rows of parallel article supporting trays, each row having a plurality of said trays in side-by-side relation, a pusher movable lengthwise of each tray to discharge the articles one-by-one from one end of each tray, an electrical circuit and electrical control means therein correlated with each tray and operative upon closing a push button in said circuit to advance the selected pusher and the articles in front of said pusher lengthwise of the selected tray and over the front portion thereof to fall by gravity to a place of delivery, means below the level of the bottoms of said articles on said trays actuated by an article falling from a selected tray to interrupt the advance movement of the pusher and means actuated by said pusher upon movement to a position to discharge the last article from a selected tray to interrupt the correlated circuit and to prevent further operation of the pusher.

15. A dispenser for individual articles of merchandise and particularly for merchandise packages comprising in a housing a plurality of horizontal rows of article supporting trays, each row containing a plurality of said trays in side-by-side relation, a pusher movable lengthwise of each tray for the discharge of articles one-by-one from one end of said tray, an electrical circuit and electrical control means therein correlated with each tray and operative upon closing a push button in said circuit to advance the selected pusher and the packages in front of the pusher lengthwise of the selected tray and over the front portion thereof for fall by gravity to a place of delivery, means below the level of the bottoms of the articles on a tray actuated by an article falling from the front portion of said trays to interrupt the advance movement of said pusher, means actuated by said pusher upon movement to a position to discharge the last article from a tray to interrupt the correlated circuit and to prevent further operation of the pusher, the last-mentioned means including a projection fastened to the bottom of the pusher and a switch located at the front portion of the tray and connected in said circuit to be opened by said projection upon the full advance of the pusher.

16. A dispenser for individual articles of merchandise and particularly for merchandise packages comprising a substantially horizontal article supporting member, means movable lengthwise of said member to advance said articles along the member and discharge them successively at one end of said member for fall by gravity to a place of delivery, means below said article support for receiving the falling article and conveying it to a place of delivery, driving means for moving said movable means along said member, and means below the level of the bottoms of the articles on the support and in the path of and actuated by movement of the article discharged from said member to render said driving means inoperative to move said movable means along said member.

17. An article dispensing device comprising a substantially horizontal elongated support for a plurality of articles, means movable lengthwise of said support for advancing said articles along said support and discharging them successively at one end thereof for fall by gravity, means below said support for receiving the falling article and conveying it to a place of delivery, driving means for moving said advancing means, mechanism for connecting said advancing means to and disconnecting it from said driving means, manually controllable means for operating said mechanism to connect said driving means to said advancing means to discharge an article into the means below said support, and means actuated by a discharged article to operate said mechanism to disconnect said driving means from said advancing means, the last-mentioned means being located between said support and said place of delivery and in the path of articles discharged from said support.

18. An article dispensing device comprising a plurality of vertically superimposed substantially horizontal supports for a plurality of articles, a pusher member movable along each support to advance the articles thereon and discharge them successively at one end of each support for fall by gravity, chute means to receive the falling articles and convey them to a place of delivery, a driving means for all of said pusher members, an electrically actuated means corresponding to each pusher member for selectively connecting said driving means to and disconnecting it from its corresponding pusher member, a first switch means corresponding to each pusher member, means electrically connecting said first switch means and said electrically actuated means to connect said driving means to a pusher member upon actuation of its corresponding switch means, and second switch means adjacent to said one end of each support below the level of the articles thereon actuated by discharge of an article therefrom to disconnect said driving means from the pusher member connected thereto.

19. An article dispensing device comprising a substantially horizontal supporting member, means movable lengthwise in said member to advance articles along said member and discharge them successively at one end of said member for fall by gravity to a place of delivery, a substantially vertical delivery chute for receiving articles falling from the front end of the supporting member and discharging them downwardly to said place of delivery, driving means for said movable means, manually controlled means for connecting said driving means to said movable means, and means in the path of and actuated by the article falling from said member for disconnecting said driving means from said movable means.

WILLIAM S. TANDLER.
DAVID S. WALKER.
FERDINAND A. de WEISS.

REFERENCES CITED

The following references are of record in the file of this patent:

UNITED STATES PATENTS

| Number | Name | Date |
|---|---|---|
| 1,356,379 | McDermott | Oct. 19, 1920 |
| 1,572,263 | Ash | Feb. 9, 1926 |
| 1,790,499 | DeWilde | Jan. 27, 1931 |
| 1,877,050 | Ray | Sept. 13, 1932 |